TAPE GUIDING MEANS FOR MAGNETIC TAPE TRANSPORTS

Filed June 16, 1961

2 Sheets-Sheet 1

INVENTOR.
JEROME ROBERT ROCK
KENJI J. SAMESHIMA
BY
Christie, Parker & Hale
ATTORNEYS.

INVENTOR.
JEROME ROBERT ROCK
KENJI J. SAMESHIMA
BY Christie, Parker & Hale
ATTORNEYS.

United States Patent Office 3,097,779
Patented July 16, 1963

3,097,779

TAPE GUIDING MEANS FOR MAGNETIC TAPE TRANSPORTS

Jerome Robert Rock, La Puente, and Kenji J. Sameshima, West Covina, Calif., assignors to Burroughs Corporation, Detroit, Mich., a corporation of Michigan Filed June 16, 1961, Ser. No. 117,569
8 Claims. (Cl. 226—97)

This invention relates to apparatus for moving magnetic tape in a tape transport, and, more particularly, to a novel arrangement for guiding the movement of a magnetic tape past a magnetic head.

Since information stored on magnetic tapes is recorded in parallel tracks along the length of the tape, it is necessary that the means for guiding the magnetic tape under a magnetic head to read the information stored therein prohibit lateral movement of the tape relative to the magnetic head. In particular, if lateral movement or skewing of a magnetic tape relative to the read head is allowed, bits of information may be missed in the reading of the tape, thereby resulting in errors in the functioning of circuitry which is dependent upon information stored on the tape for accurate operation.

In the past, two basic means have been utilized to provide guiding of a moving magnetic tape. The first means employs a tape support having two fixed shoulder guides, one disposed on either side of the tape. The fixed shoulders are dimensioned to accommodate the maximum width tape plus a small safety factor. This arrangement provides satisfactory operation for the maximum width tape. However, when a tape of a lesser width is being read, such a fixed-guide arrangement does not provide close tolerance support of the edges of the tape. Thus the tape may run through the guides at an angle relative to the read head, thereby allowing bits of information to be lost.

The second class of tape guide means employs one or more spring-loaded guide shoulders. These shoulders press against the edge of the tape to maintain alignment of the tape as it passes under the read head. Due to the pressure of the guides against the edges of the tape, the tape edge is caused to wear which after a number of readings results in misalignment of the tape tracks with the read heads. Further, since this arrangement utilizes forces against the edge of the tape to maintain tape alignment, lateral forces are set up in the tape which, for light-weight tapes, may result in buckling of the tapes unless the spring-loading is mechanically adjusted. Still further, due to the wearing of the edges of the magnetic tape, oxide powder is produced which may interfere with the detection of bits of information by the read head as well as misalignment of the tape by seating of the powder under and along the edges of the tape as it is guided under the read head.

The spring-loaded tape guide arrangement possesses a further limitation in that, due to the inertia of the springs, they are unable to react to small irregularities in the edge of the magnetic tape as it rapidly passes under the read head.

In view of the above, the present invention provides a novel tape guiding arrangement which maintains the edge of a magnetic tape against a fixed guide support regardless of irregularities in the edge of the tape without exerting undue forces on the edge of the tape.

To accomplish this, the present invention in a basic form includes a support means for longitudinally supporting a magnetic tape as it moves under a magnetic head. The support means has a flanged edge which acts as a shoulder against which the edge of the tape is gently guided to maintain alignment as it passes under the magnetic head. To maintain the tape in gentle contact with the flange, the present invention contemplates that a stream of air be passed over the upper surface of the tape. In particular, the stream of air is directed from a point above the surface of the tape at an acute angle thereto. The stream of air is readily adjustable to provide a lateral and a normal force to the tape to maintain the tape in contact both with the flanged edge and the surface of the support means.

Since in the present invention a stream of air is utilized to maintain an edge of a magnetic tape gently against a shoulder guide, undue friction forces are not exerted on the edges of the tape. Further, due to the passage of air over the tape, the tape is kept clear of oxide powder and any lint which may enter the tape storage area of the tape transport.

Still, further, since the air being directed over the surface of the tape is under pressure, it acts to pressurize the tape storage area, thereby preventing external dust or lint from entering the area.

Due also to the air guiding arrangement, the present invention easily accommodates tape of varying width. Thus, the read head with which the guide means of the present invention is associated may be utilized to read information from any width tape.

For a more complete understanding of the above as well as other features of the present invention, reference may be had to the following detailed description considered with the drawings, in which.

Figure 1:
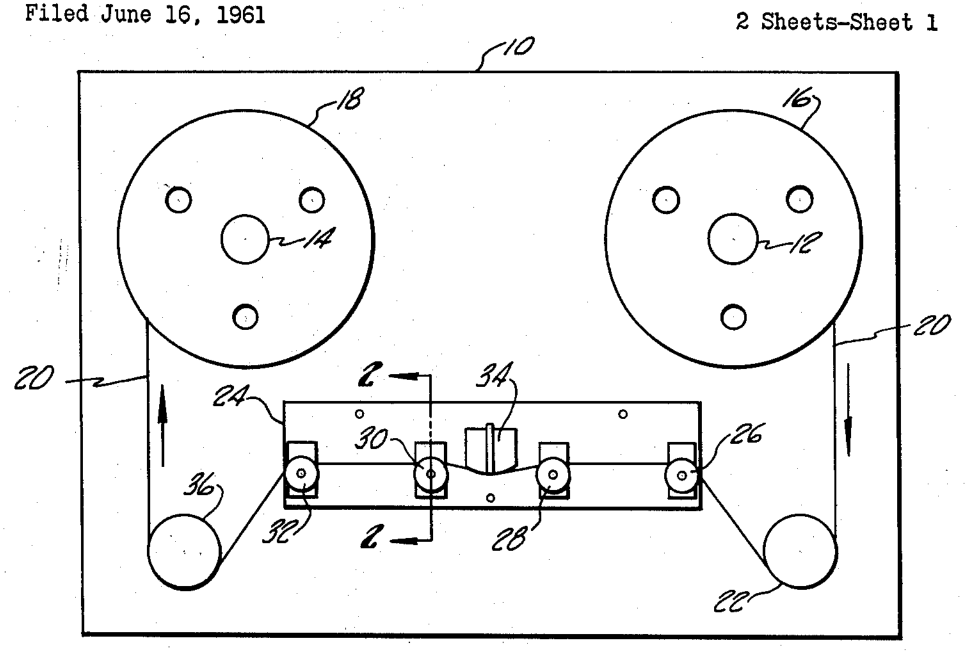
FIGURE 1 is a diagrammatic representation of the tape storage area of a tape transport utilizing the tape guiding arrangement of the present invention.

Referring to FIGURE 1, there is shown a tape storage compartment of a tape transport utilizing the present invention. As illustrated, the tape storage area includes a main panel 10 to which there is mounted by spindles 12 and 14 a feed reel 16 and a take-up reel 18, respectively. As represented, the feed reel 16 includes a magnetic tape 20 wound thereon. The magnetic tape 20 passes from the feed reel 16 around a fixed tape guide 22 to a tape guiding arrangement. The tape guiding arrangement includes a mounting panel 24 to which there is coupled tape support means 26, 28, 30, and 32, as well as a magnetic read head 34. As illustrated, the magnetic tape 20 passes over the tape guide arrangements 26 and 28, under the read head 34, over the tape guide arrangements 30 and 32, around a fixed tape guide 36 to the take-up reel 18.

By motor drive means (not specifically shown), the feed reel 16 and the take-up reel 18 are caused to rotate at a high speed. The tape 20 is thereby fed from the feed reel 16, guided in a manner taught by the present invention (as will be specifically described in connection with FIGURE 2) under the read head 34, to the take-up reel 18.

Figure 2:
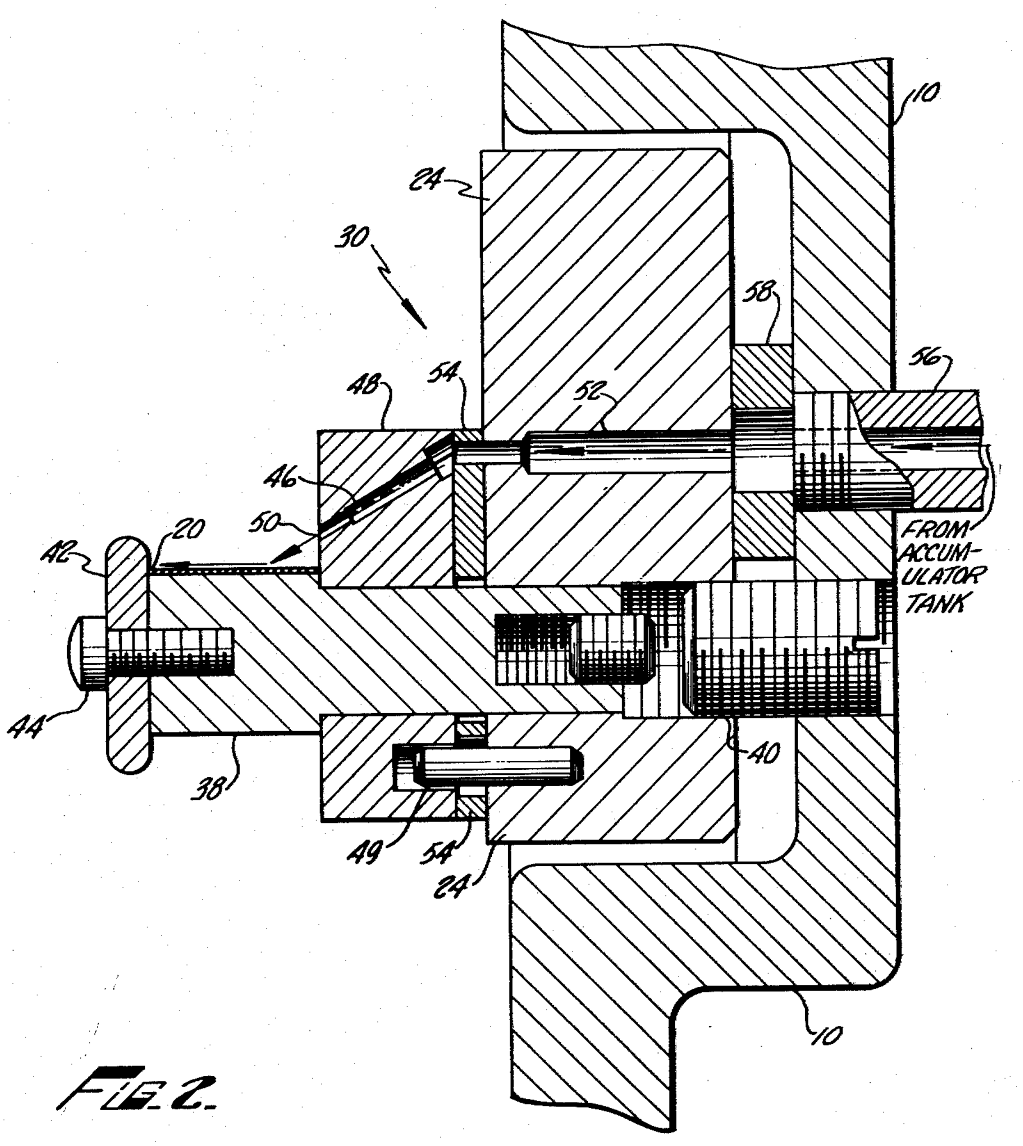
FIGURE 2 is a cross-sectional view along the cutting line 2—2 represented in FIGURE 1.

To guide the tape 20 such that it maintains alignment in moving under the read head 34, each of the tape support arrangements 26, 28, 30, and 32 include the apparatus specifically shown in FIGURE 2 which represents, by way of example only, a preferred embodiment of the tape guide arrangements of the present invention. As illustrated, the magnetic tape 20 is longitudinally supported upon the surface of a support means 38 which, as shown, is attached by a screw arrangement 40 to the mounting plate 24. Further, as illustrated, a flange configuration 42 is fixedly coupled by a screw 44 to the support means 38. The flange 42, as represented, acts as a shoulder to guide the edge of the magnetic tape 20 as it passes under the magnetic read head 34.

As previously mentioned, to provide means for maintaining the edge of the magnetic tape 20 gently against the flange 42, the present invention contemplates that a stream of air be passed over the upper surface of the magnetic tape 20. In particular, as represented in FIGURE 2, this stream of air is produced by an air jet represented at 46 which is positioned within a shoulder arrangement 48, the shoulder 48 in turn being pinned at 49 to the mounting plate 24. As illustrated, the air jet 46 has its orifice 50 positioned in a plane above the surface of the magnetic tape 20. Further, the longitudinal axis of the air jet 46 is positioned in a plane which makes an acute angle with the surface of the magnetic tape 20.

Due to the positioning of the orifice 50 above the surface of the magnetic tape 20, the stream of air passing from the air jet 46 is prevented from passing under the magnetic tape 20, thereby causing an undesired lifting of the tape. Further, due to the acute angle of the air jet 46, a force is exerted upon the upper surface of the magnetic tape 20 which has a lateral component maintaining the edge of the magnetic tape 20 gently against the flange 42 and a normal component which maintains the magnetic tape 20 against the upper surface of the support means 38 as the magnetic tape is moved under the read head 34.

To supply air to the air jet 46, a hole 52 is provided in the mounting plate 24. As represented, the hole 52 provides a direct path through a gasket arrangement 54 to one end of the air jet 46. As will be described in detail in connection with FIGURE 3, the air supply of the present invention is from an accumulator tank. To couple the air from the accumulator tank to the jet 46, tubing is provided, a portion of which is represented at 56. In particular, the tubing 56 passes air through a gasket 58 to the slot 52, and hence to the air jet 46.

In order to produce the desired air flow, the air applied to the air jet 46 must be under pressure relative to that existing at the magnetic tape 20. To provide the desired air pressure, an arrangement as represented in block diagram form in FIGURE 3 may be utilized. As represented, air to be supplied to the air jet 46 is drawn into the system by an air intake represented at 60. This air is filtered by an air filter 62 to remove impurities such as dust and lint. The filtered air is in turn passed to a pressure pump 64 which is driven by a motor 66. The pressure pump 64, which is of a type well known in the art, pumps the air under pressure to an accumulator tank 68. The accumulator tank has a volume sufficient to supply the needed air to the tape guide arrangements represented in FIGURE 1. Coupled to the accumulator tank is a relief valve 70. The relief valve 70 is adjustable as represented by the variable knob 72 and operates in a manner well known in the art to bleed off air to the atmosphere if the pressure within the accumulator tank exceeds a predetermined value. As represented, the air stored in the accumulator tank, the pressure of which is controlled by the relief valve 70, is passed through a moisture and particle filter 74 and hence through the tubing 56 to the air jet 46.

Figure 3:
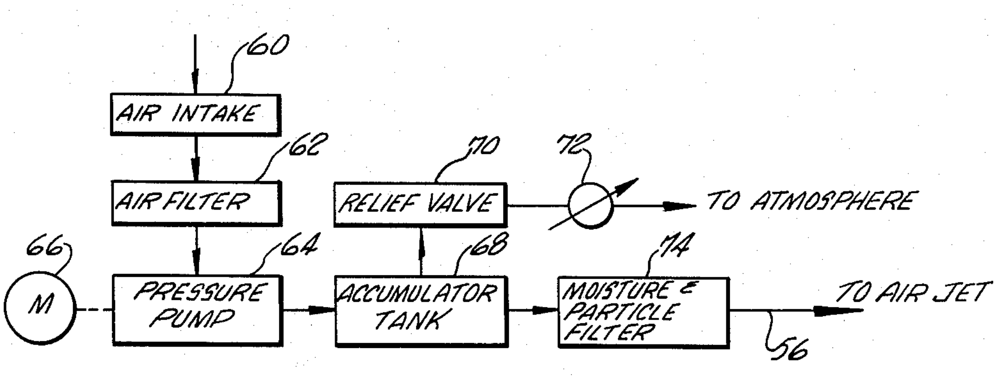
FIGURE 3 is a block diagram representation of an arrangement for providing air under pressure to the tape guiding configuration illustrated in FIGURE 2.

As represented in FIGURE 3, the pressure of the air supplied to the air jet 46 may be regulated. In particular, after the particular dimensions of the configuration represented in FIGURE 2 have been selected and the height of the orifice 56 above the magnetic tape surface and the angle of the air jet 46 determined, regulation of the pressure of the air supplied by the accumulator tank 68 may be utilized to selectively control the forces supplied to the upper surface of the magnetic tape by the air jet passing thereover. In particular, for Mylar backed magnetic oxide coated tape of the type commonly used in the art, it has been found that a lateral force of approximately 5.3 grams is preferred to maintain the magnetic tape against the flange 42. This magnitude of force operates to maintain the edge of the tape 20 in continuous contact with the flange 42 irrespective of irregularities in the edge of the tape 20. In providing this magnitude of lateral force, it has been found that positioning the longitudinal axis of the air jet 46 at a substantially thirty degree (30°) angle relative to the surface of the magnetic tape 20 produces an optimum relationship between the lateral and normal forces on the magnetic tape due to the air jet. With the air jet 46 positioned at a substantially 30° angle relative to the surface of the magnetic tape 20, it has further been found that for an orifice diameter of approximately 0.03 inch an air pressure of substantially 5.5 pounds per square inch produces the desired magnitude of lateral force on the magnetic tape 20. Thus, the relief valve 70 may be set to 5.5 p.s.i., thereby regulating the pressure of the air supplied by the accumulator tank 68 to the air jets 46 of the respective tape guiding arrangements.

Accordingly, by use of a stream of air directed from a point above the surface of a magnetic tape over the magnetic tape, the magnetic tape is maintained in continuous and gentle contact with the support shoulder of the tape guide arrangement of the present invention irrespective of irregularities in the edge of the magnetic tape. Further, due to the flow of air over the surface of the magnetic tape, oxide powders normally developed in the reading of information from a magnetic tape are cleared from the tape surface. Further, due to the supply of air under pressure to the magnetic tape, the tape storage area of the tape transport may be maintained at a pressure which prohibits external lint and dust from entering the tape storage area.

Although the present invention has been described in connection with the reading of information from a magnetic tape, it is to be understood that this application is not limited thereto. In particular, it may be utilized in connection with the writing of information in highly aligned tracks on a magnetic tape.

What is claimed is:

1. Apparatus for guiding a thin flexible strip of material having first and second opposing surfaces comprising: a guide member having a surface engaging the first surface of the strip; means providing a shoulder extending along the surface of the guide member; and means for directing a fluid stream against the second surface of the strip and toward the shoulder to maintain an edge of the strip in engagement with the shoulder.

2. Apparatus for guiding a thin flexible strip of material having opposing surfaces comprising: a guide member having a surface engaging one of the surfaces of the strip; means providing a shoulder extending along the surface of the guide member; means for developing a fluid stream; and means for directing the fluid stream across the other surface of the strip at an acute angle relative to the surface of the guide member to maintain an edge of the strip in engagement with the shoulder.

3. Apparatus for guiding a moving tape having opposing surfaces comprising: support means having a surface for longitudinally supporting one surface of the tape; means providing a shoulder extending along the surface of said support means; a gas jet having its orifice positioned in a plane above the surface of said support means, said gas jet having a longitudinal axis positioned to lie in a plane which makes an acute angle with the surface of said support means; means for directing gas under pressure to said gas jet such that a stream of gas is directed across an opposing surface of the tape to maintain an edge of the tape against the shoulder as the tape moves over the support means.

4. The apparatus defined in claim 3 wherein said acute angle is substantially equal to thirty degress.

5. In an arrangement for guiding a magnetic tape past a magnetic head which includes a support means for longitudinally supporting the magnetic tape, said support means having a flanged edge, means for maintaining an edge of the magnetic tape against the flanged edge as the tape longitudinally moves past the magnetic head comprising: means for developing a stream of gas; and gas-directing means for directing the stream of gas across an upper surface of the tape at an acute angle relative to the surface of the tape, said gas-directing means being positioned to lie in a plane above the surface of the tape.

6. Apparatus for guiding a moving magnetic tape in a tape transport comprising: support means for longitudinally supporting a magnetic tape, said support means having a flanged edge substantially parallel to an edge of the tape; a gas jet having its orifice positioned above an upper surface of the tape, said gas jet being positioned to lie in a longitudinal plane which makes an acute angle with the surface of the tape; an accumulator tank connected to said gas jet; means for pumping gas under pressure to said accumulator tank; means coupled to said accumulator tank for regulating the pressure of the gas within the tank such that a stream of gas is directed across the surface of the tape producing a force on the tape which has a lateral component sufficient to maintain an edge of the tape against the flange while the tape is moving and a component normal to the surface of the tape which is sufficient to maintain the tape in contact with the support means.

7. The apparatus defined in claim 6 wherein the diameter of the orifice of the gas jet, the pressure of the gas within the accumulator tank, the height of the orifice above the surface of the tape, and the angle of the jet relative to the surface of the tape are proportioned to produce a lateral force upon the tape which falls within the range of 5.0 to 5.5 grams.

8. Apparatus for guiding a moving tape in a tape transport past a magnetic head comprising: a plurality of support means for longitudinally supporting one surface of the magnetic tape, each of said support means having a flanged edge substantially parallel to one edge of the tape and being disposed on either side of a magnetic head; a plurality of gas jets one associated with each support means, each gas jet having its orifice positioned in a plane above the other edge of the magnetic tape, each of said gas jets being positioned to lie in a plane which makes an acute angle with an exposed surface of the magnetic tape; means for directing a gas under pressure to each of said gas jets such that a plurality of streams of gas are directed across the exposed surfaces of the magnetic tape to maintain an edge of the magnetic tape against the flange of each support means as the tape moves under the magnetic head.

References Cited in the file of this patent

UNITED STATES PATENTS

| | | |
|---|---|---|
| 2,621,391 | Hoffman et al. | Dec. 16, 1952 |
| 2,622,306 | Anderson | Dec. 23, 1952 |
| 2,747,025 | Selsted | May 22, 1956 |
| 2,848,820 | Wallin et al. | Aug. 26, 1958 |
| 2,947,489 | Russell | Aug. 2, 1960 |